Patented Apr. 29, 1924.

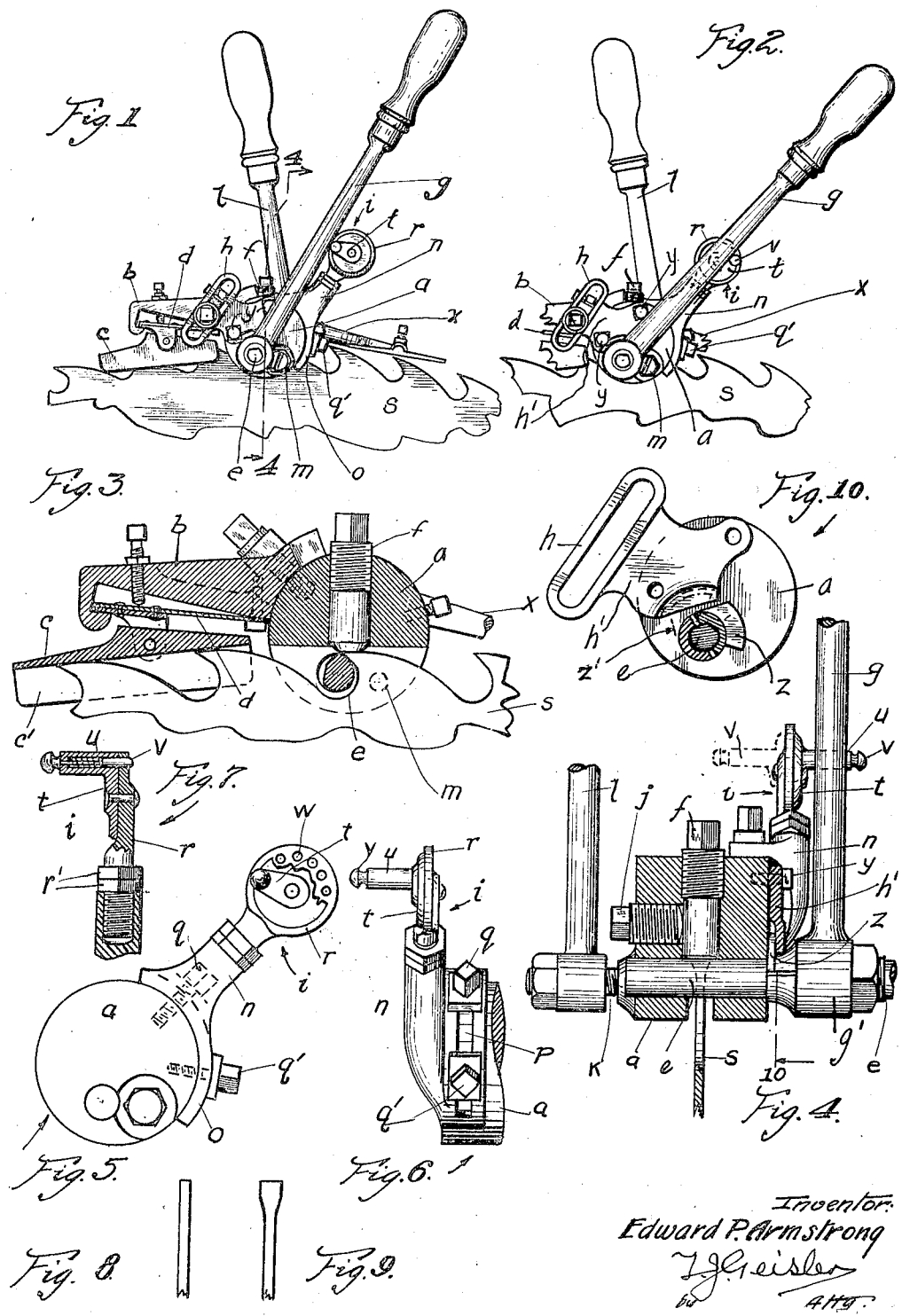

1,492,152

UNITED STATES PATENT OFFICE.

EDWARD P. ARMSTRONG, OF PORTLAND, OREGON.

SAW SWAGE.

Application filed October 17, 1921. Serial No. 508,137.

*To all whom it may concern:*

Be it known that I, EDWARD PIKERING ARMSTRONG, a citizen of the United States, and a resident of Portland, county of Multnomah, and State of Oregon, have invented a certain new and useful Improvement in Saw Swages, of which the following is a specification.

My invention relates to saw swaging devices of the type illustrated in my Letters Patent of the United States of America, dated February 18, 1908, No. 879,352.

By reference to such patent it will be noted that the devices effecting the saw swaging operation comprise an anvil, and a rotatable die of eccentric cross section. The saw tooth is placed between the anvil and the die; and the swaging of the point of the saw tooth is done by rotating the latter. That is to say, the point of the saw tooth is swaged to the desired degree by the pressure to which it is subjected between the anvil and the eccentric portion of the die.

Since all the teeth of the saw must be swaged uniformly, and the degree of swaging of different saws must be varied relatively to the work to be done by the saw, means are necessarily provided for determining the amount of rotation to be given said die. My present invention deals specifically with such means.

In these types of saw swages the rotatable die has a handle mounted on it by which to effect the rotation. Heretofore a stop was provided limiting the angular movement of this handle, and thus determining the degree of the swaging. The object of my invention is to provide an improved stop adapted to permit a wide range in the amount of swage given the saw teeth; and, furthermore, to provide a stop of simple construction, and which may be readily adjusted to the work to be done.

Another object of my invention is to provide for the longitudinal movement of the die, for readjustment of the handle thereon, so as to bring a different portion of the die into action, or to insert a new die.

This result I attain by so constructing the back stop that it may be adjusted out of the path of the operating handle, and so constructing the means by which the die is held against longitudinal movement, that these means are disengaged by rotation or angular movement of the operating handle beyond the back stop.

The construction and operation of my improvement are shown by the accompanying drawings, in which:

Fig. 1 is a side elevation showing a fragment of a circular saw with a swage of the type above referred, and embodying my invention, applied to the saw as in practice, in this view my improved stop is shown as adjusted to limit the movement of the operating handle of the rotatable die so as to give the latter its minimum rotation;

Fig. 2 is approximately a similar view of Fig. 1, showing my improved stop so adjusted as to permit the operating handle of the rotatable die to be given its maximum swaging movement;

Fig. 3 is a longitudinal section of my improved swage, with parts omitted; this view illustrating the construction and operation of said swaging devices in the type of saw swage above referred to;

Fig. 4 is a partial transverse section approximately taken on the line 4—4 of Fig. 1;

Figs. 5, 6 and 7 show details of my improved type;

Figs. 8 and 9 illustrate the action of my saw swage; Fig. 8 showing a saw tooth point before having been swaged and Fig. 9 showing the same after having been swaged; and Fig. 10 is a sectional detail approximately taken on the line 10 of Fig. 4, and illustrates the means provided for holding the die against longitudinal movement, at the same time permitting this die to be removed when the operating handle $g$ is rotated to such extent as to disengage the parts $h'$ and $z$ (see Fig. 4); such rotation of the operating handle being possible only when the back stop has been arranged so as to clear the path of the operating handle, which arrangement is illustrated by the dotted lines $v$ of Fig. 4.

$a$ is the body of my swage, $b$ a bracket, projecting from the body, $c$ a rider or guide having flanges $c'$ as shown in Fig. 3, and pivotally supported from a plate $d$ affixed to the bracket $b$. $e$ is a shaft like die of eccentric cross-section with respect to its axis of rotation. $f$ is an anvil resting on the back of the saw tooth and against which the point of the latter is pressed when the die is rotated for accomplishing the swaging process. *g* is an operating handle affixed on the die *e*. *g'* is the boss which carries the lip *z*. *h* is an adjustable front stop for the operating handle and *h'* the projection which prevents the operating handle *g* from being withdrawn when this handle is between the stops *h* and *i*. *i* is the adjustable back stop with which my invention is particularly concerned. The details of this back stop are hereinafter described. *j* is the clamping screw of the anvil. *k* is one of the saw tooth clamping screws, *l* is the operating handle of the latter clamping screw and *m* is the companion clamping screw for the saw tooth. The saw is designated *s*. The construction and functions of the parts so far described will be readily understood without further detail.

Referring now to my improved back stop the same consists of an arm *n* provided with a curved base plate *o*, the latter being provided with a slot *p* in which are inserted clamping screws *q*, *q'*; the latter constructions being provided so that the arm *n* may have angular adjustment.

The free end of the arm *n* is provided with a disk *r* which may be mounted on the arm *n* as clearly seen by comparing Figs. 5, 6 and 7. On the disk *r* is rotatably mounted a rotatable arm *t* provided at its free end with a stop pin *u*. In order to lock the rotatable arm *t* in place as adjusted I provide a spring controlled locking pin *v* for insertion in one of the series of radially disposed pin holes *w* provided on the disk *r*. *x* is a supplemental rider or saw guide the utility of which is self evident in Fig. 1. *y* represents the screws that hold the front stop *h* to the body *a*.

From the foregoing description it will be apparent that when the saw requires only a minimum bite with the swage the stop will be adjusted as shown in Fig. 1; and for saws requiring greater swaging the rotatable pin carrying disk of the stop may be moved around to the right; supplementing such adjustment—where maximum swaging is desired—by moving of the stop itself to its position in Fig. 2.

Another feature of my invention is that the disk *r* of my improved back-stop *i* is rotatably supported on the arm *n*, so that said disk may be turned around so as to place the stop pin *v*, carried by the arm *t*, in its position shown by dotted lines in Fig. 4; out of the path of the operating handle *g*. This will permit the latter to be rotated to such extent as to disengage the lip *z*, provided on the boss *g'* of the operating handle from the flanges *h'* of the front stop *h*, hence permitting the die to be removed. The disk *r* is secured in place by nuts *r'*, *r'*.

The advantage of the combination comprising the stop arm *n*, with its rotatable upper part including the disk *r*, the stop-pin carrying arm *t* rotatably mounted on such disk and the means for locking the latter arm in place is this: The die *e* is more or less frequently removed for cleaning out its bearings or shifting it longitudinally as mentioned; on the other hand, when the proper adjustment of the stop pin *u* has once been determined relatively to the work to be done, it of course expedites the work if the adjustment of the stop-pin is not disturbed. Hence, by said combination the whole upper portion of the stop arm may be turned out of the path of the operating handle *g*, thus leaving said stop pin adjustment intact, at the same time permitting the rotation of the operating handle to the required degree for removing the die by the simple act of rotating the upper part of the stop arm so as to move the stop pin out of the path of the operating handle.

I claim:

1. In a saw swage of the character described, including a rotatable die and an operating handle for the latter, a stop for the operating handle comprising, an arm radially projecting from the body of the swage, an arm rotatably carried by the free end of the first mentioned arm, a stop-pin on the extremity of the rotatable arm, means for locking the latter arm in place, said means consisting of a disk on the free end of the first mentioned arm on which said rotatable arm is pivoted, and a locking pin inserted in one of a series of holes therefor provided in said disk.

2. In a saw swage of the character described, including a rotatable die and an operating handle for the latter, a stop for the operating handle comprising, an arm radially projecting from the body of the swage, an arm rotatably carried by the free end of the first mentioned arm, a stop-pin on the extremity of the rotatable arm, means for locking the latter arm in place, said means consisting of a disk on the free end of the first mentioned arm on which said rotatable arm is pivoted, and a spring controlled locking pin inserted in one of a series of holes therefor provided in said disk.

3. In a saw swage of the character described, including a rotatable die and an operating handle for the latter, a stop for the operating handle comprising, an arm radially projecting from the body of the swage, and adapted for angular adjustment on the body, means for clamping said arm in place, an arm rotatably carried by the free end of the first mentioned arm, a stop-pin on the extremity of the rotatable arm, means for locking the latter arm in place.

4. In a saw swage of the character described having a cylindrical body and including a rotatable die and an operating handle for the latter, a stop for the operating handle, comprising an arm having a curved base plate mounted on said cylindrical body of the saw swage and adapted for angular adjustment in a plane to the one in which the operating handle rotates, means for clamping said arm in place.

5. In a saw swage of the character described having a cylindrical body and including a rotatable die and an operating handle for the latter, a stop for the operating handle, comprising, an arm having a curved base plate mounted on said cylindrical body of the saw swage and adapted for angular adjustment in a plane to the one in which the operating handle rotates, means for clamping said arm in place, an adjustable stop handle carried by the free end of said arm, and adapted for being positioned on either side of and at variable distances from longitudinal axis of said arm.

6. In a saw swage of the character described, including a rotatable die and an operating handle for the latter, a stop for the operating handle, comprising, an arm mounted on said saw swage and adapted for angular adjustment in a plane to the one in which the operating handle rotates, means for clamping said arm in place, a member rotatably carried by the free end of the first mentioned arm, a stop pin on the extremity of said rotatable member, means for locking the rotatable member in place.

7. In a saw swage of the character described, including a rotatable die and an operating handle for the latter, a stop for the operating handle, comprising, an arm mounted on said saw swage and adapted for angular adjustment in a plane to the one in which the operating handle rotates, means for clamping said arm in place, a member rotatably carried by the free end of the first mentioned arm and constituting a longitudinal extension thereof, a stop pin on the extremity of said rotatable member, means for locking the rotatable member in place.

8. In a saw swage of the character described including a rotatable die and an operating handle for the latter, a stop-arm projecting from the body of the swage, such arm having a rotatable portion at its free end, an adjustable stop-pin, carried by said rotatable portion, adapted for being positioned on either side of, and at variable distance from the longitudinal axis of said stop arm, and means in part carried by the operating handle normally holding the die against longitudinal movement, but rendered inoperative by the rotation of the operating handle beyond said stop-pin.

9. In a saw swage of the character described including a rotatable die and an operating handle for the latter, a stop-arm projecting from the body of the swage, such arm having a rotatable portion at its free end, and the latter carrying a disk, a stop-pin carrying-arm pivoted on said disk, means for locking the latter arm in place on said disk, and means in part carried by the operating handle normally holding the die against longitudinal movement, but rendered inoperative by the rotation of the operating handle beyond said stop-pin.

10. In a saw swage of the character described including a rotatable die and an operating handle for the latter, a stop-arm projecting from the body of the swage, such arm having a rotatable portion at its free end, and the latter carrying a disk provided with a series of radially disposed holes, a stop-pin carrying-arm pivoted on said disk, means for locking the latter arm in place on said disk, and means in part carried by the operating handle normally holding the die against longitudinal movement, but rendered inoperative by the rotation of the operating handle beyond said stop-pin.

EDWARD P. ARMSTRONG.